(12) United States Patent
Matsuzaki et al.

(10) Patent No.: US 10,120,188 B2
(45) Date of Patent: Nov. 6, 2018

(54) HEAD-UP DISPLAY DEVICE AND VEHICLE

(71) Applicant: PANASONIC INTELLECTUAL PROPERTY MANAGEMENT CO., LTD., Osaka (JP)

(72) Inventors: Keiichi Matsuzaki, Kyoto (JP); Michihiro Yamagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/671,299

(22) Filed: Aug. 8, 2017

(65) Prior Publication Data

US 2017/0357088 A1   Dec. 14, 2017

Related U.S. Application Data

(63) Continuation of application No. PCT/JP2016/004630, filed on Oct. 19, 2016.

(30) Foreign Application Priority Data

Mar. 24, 2016   (JP) ................................. 2016-059370

(51) Int. Cl.
*G02B 27/01*      (2006.01)
*B60K 35/00*      (2006.01)
(Continued)

(52) U.S. Cl.
CPC .............. *G02B 27/01* (2013.01); *B60K 35/00* (2013.01); *G02B 5/30* (2013.01); *G02B 6/3512* (2013.01);
(Continued)

(58) Field of Classification Search
CPC ........................ G02B 27/01; G02B 27/0101; G02B 27/0149; G02B 27/10; G02B 27/123;
(Continued)

(56) References Cited

U.S. PATENT DOCUMENTS

2008/0088612 A1   4/2008   Yeo et al.
2009/0160736 A1   6/2009   Shikita
2017/0146803 A1*  5/2017   Kishigami ......... G02B 27/0179

FOREIGN PATENT DOCUMENTS

JP          06-115381      4/1994
JP          11-3853        1/1999
(Continued)

*Primary Examiner* — Leon Flores
(74) *Attorney, Agent, or Firm* — Greenblum & Bernstein, P.L.C.

(57) ABSTRACT

A head-up display device includes a display element, a beam splitter, a movable mirror, first and second mirrors, and a movable unit. The display element emits light to form a display image. The beam splitter being an optical member that reflects light or through which light is transmitted, reflects light emitted from the display element. The movable mirror reflects light reflected off the beam splitter. The first and second mirrors that reflect light movable mirror, or through which the light transmitted through the beam splitter is transmitted, project a virtual image. The movable unit adjusts a distance between the movable mirror and the beam splitter to adjust a projection distance of the virtual image.

12 Claims, 12 Drawing Sheets

(51) Int. Cl.
- *G02B 26/10* (2006.01)
- *H04N 5/74* (2006.01)
- *G02B 6/35* (2006.01)
- *G02B 5/30* (2006.01)
- *G02B 27/10* (2006.01)
- *G02B 27/12* (2006.01)
- *G02B 27/28* (2006.01)
- *G02B 27/40* (2006.01)
- *G02B 6/12* (2006.01)

(52) U.S. Cl.
CPC ........... *G02B 6/3516* (2013.01); *G02B 26/10* (2013.01); *G02B 27/0101* (2013.01); *G02B 27/0149* (2013.01); *G02B 27/10* (2013.01); *G02B 27/123* (2013.01); *G02B 27/28* (2013.01); *G02B 27/40* (2013.01); *H04N 5/74* (2013.01); *B60K 2350/405* (2013.01); *G02B 2006/12104* (2013.01); *G02B 2027/014* (2013.01); *G02B 2027/0154* (2013.01); *G02B 2027/0159* (2013.01); *G02B 2027/0183* (2013.01); *G02B 2027/0185* (2013.01); *G02B 2027/0187* (2013.01)

(58) Field of Classification Search
CPC ...... G02B 27/28; G02B 27/40; G02B 6/3512; G02B 6/3516; G02B 26/10; B60K 35/00
See application file for complete search history.

(56) References Cited

FOREIGN PATENT DOCUMENTS

| | | |
|---|---|---|
| JP | 2008-116932 | 5/2008 |
| JP | 2009-150947 | 7/2009 |
| JP | 2014-028593 | 2/2014 |
| JP | 2014-063092 | 4/2014 |
| WO | 2015/190157 | 12/2015 |

* cited by examiner

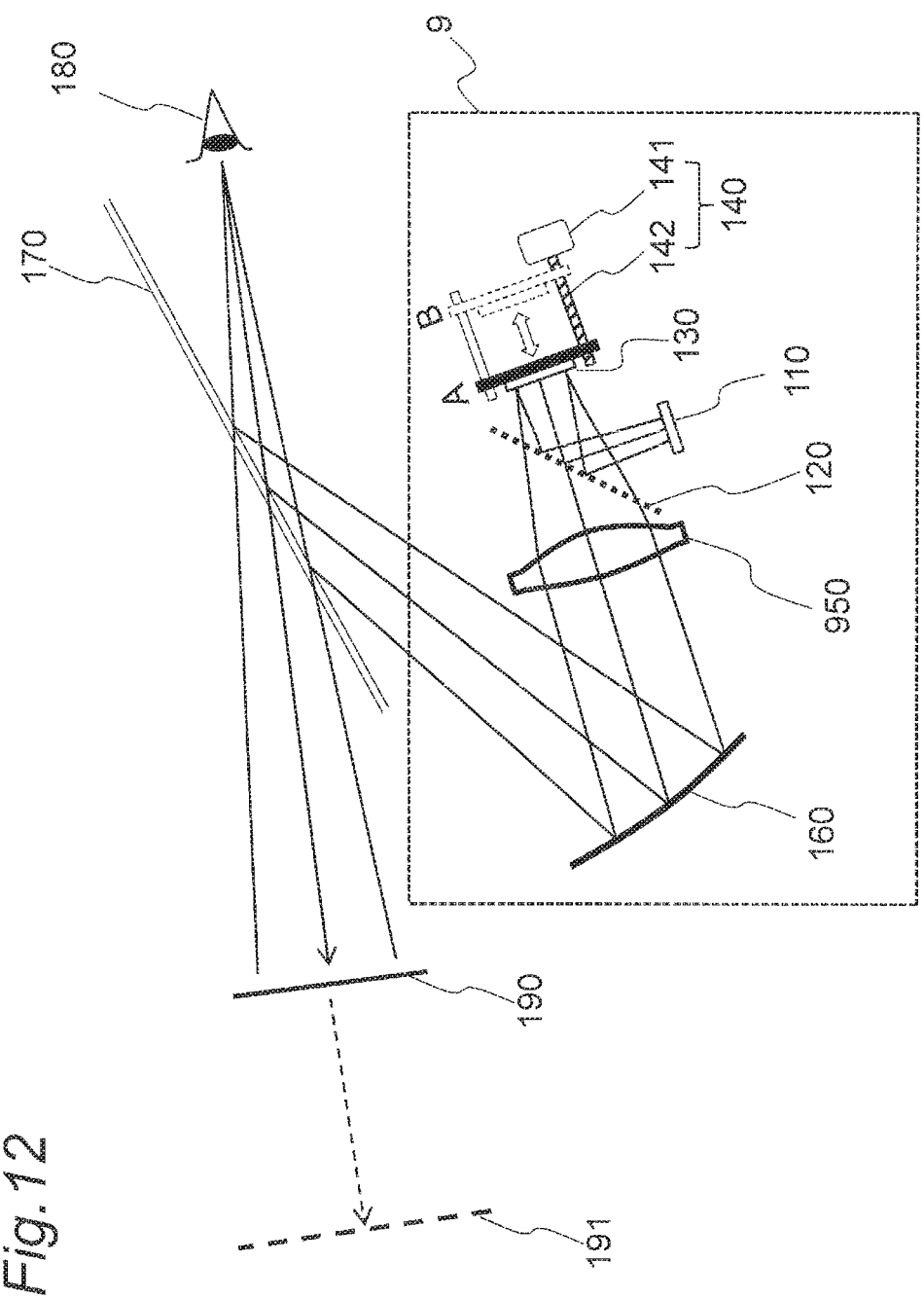

HEAD-UP DISPLAY DEVICE AND VEHICLE

RELATED APPLICATIONS

This application is a Continuation application of International Application No. PCT/JP2016/004630, filed Oct. 19, 2016, and claims the benefit of Japanese application No. 2016-059370, filed Mar. 24, 2016, the disclosures of which are incorporated by reference herein in their entireties.

TECHNICAL FIELD

The present disclosure relates to a vehicle display device, and more particularly to a head-up display device used in an automobile or the like.

BACKGROUND

There is known a head-up display device as an information display device of an automobile or the like.

Japanese Laid-Open Patent Publication No. H6-115381 discloses a head-up display device using a concave mirror as a turning mirror that can vary a position of a virtual image by varying a distance between a display as an object point and the concave mirror within a range allowing a virtual image point mirrored by the concave mirror to appear, in a manual manner or an automatic manner, or in a combination of these manners.

Japanese Laid-Open Patent Publication No. 2009-150947 discloses a vehicle head-up display device that includes a light source, a scan unit that scans light from the light source in a two-dimensional manner, a screen on which an image is formed by scanned light, and a projection unit that projects the image on the screen, and that varies a distance between the projection unit and the screen to vary a position of a virtual image projected.

SUMMARY

The present disclosure provides a head-up display device capable of varying a projection distance of a virtual image to be projected at high speed.

A head-up display device in the present disclosure includes a display that emits light to form a display image, a light separator being an optical member that reflects light or through which light is transmitted, and that reflects light emitted from the display, a first optical member that reflects light reflected off the light separator, one or more second optical members that reflect light transmitted through the light separator after being reflected off the first optical member, or through which the light transmitted through the light separator is transmitted, to project a virtual image, and an adjuster that adjusts a distance between the first optical member and the light separator to adjust a projection distance of the virtual image.

According to the present disclosure, a head-up display device capable of varying a projection distance of a virtual image to be projected at high speed can be provided.

BRIEF DESCRIPTION OF DRAWINGS

FIG 12 illustrates an example of a structure of an optical system unit of a head-up display device in an embodiment 8 of the present disclosure.

DESCRIPTION OF EMBODIMENT

Figure 1:
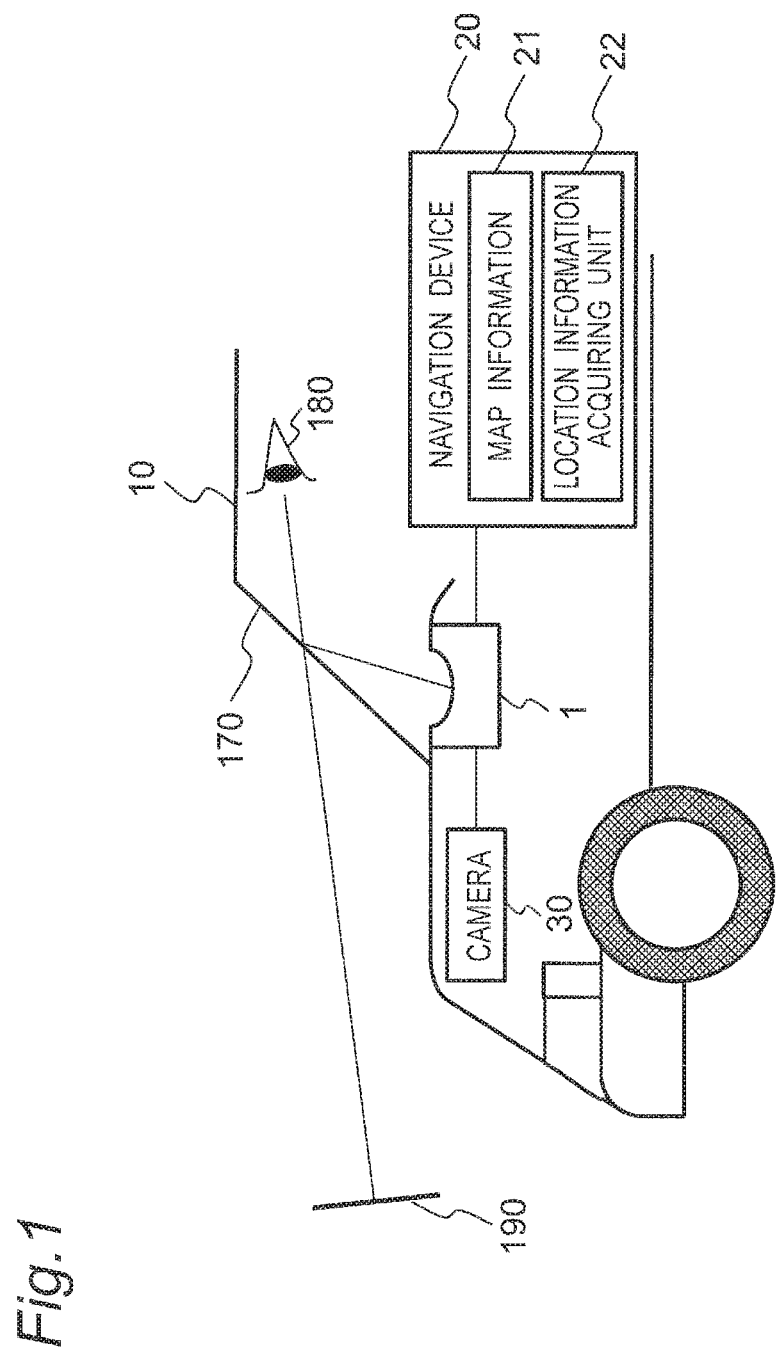
FIG. 1 illustrates an example of a structure of a vehicle provided with a head-up display device in an embodiment of the present disclosure.

Embodiments of the present invention will be described below while appropriately referring to accompanying drawings. Detailed description more than necessary may be eliminated. For example, detailed description of a well-known matter and duplicated description of substantially identical structure may be eliminated. This allows the description below to avoid becoming unnecessarily lengthy for easy understanding by a person skilled in the art. The inventors provide the accompanying drawings and the description below to allow a person skilled in the art to sufficiently understand the present disclosure, so that there is no intension to limit a subject of the description to the scope of claims.

In all the drawings, an element having a common function is designated by the same reference numeral, and duplicated description on an element that has been described is eliminated.

(Embodiment 1)
[1-1. Structure]
[1-1-1. Structure of Vehicle]

FIG. 1 illustrates an example of a structure of a vehicle provided with a head-up display device in an embodiment of the present disclosure. FIG. 1 illustrates a vehicle 10 that includes a head-up display device 1, a navigation device 20, and a camera 30.

The navigation device 20 provides information on a route to a predetermined destination to a driver to guide the route. The navigation device 20 includes a built-in memory in which map information 21 is stored. The navigation device 20 also includes a location information acquiring unit 22 such as a global positioning system (GPS) to acquire location information on the vehicle itself, and stores the information in the built-in memory.

The camera 30 takes a picture ahead of the vehicle itself, for example, to create image information.

The head-up display device 1 projects image light on a windshield 170 of the vehicle to project a virtual image 190 ahead of the windshield 170 with respect to driver's eyes 180. The head-up display device 1 sets a projection position of the virtual image 190 on the basis of location information on the vehicle or map information from the navigation device 20, or image information from the camera 30.

[1-1-2. Schematic Structure of Head-up Display Device]

Figure 2:
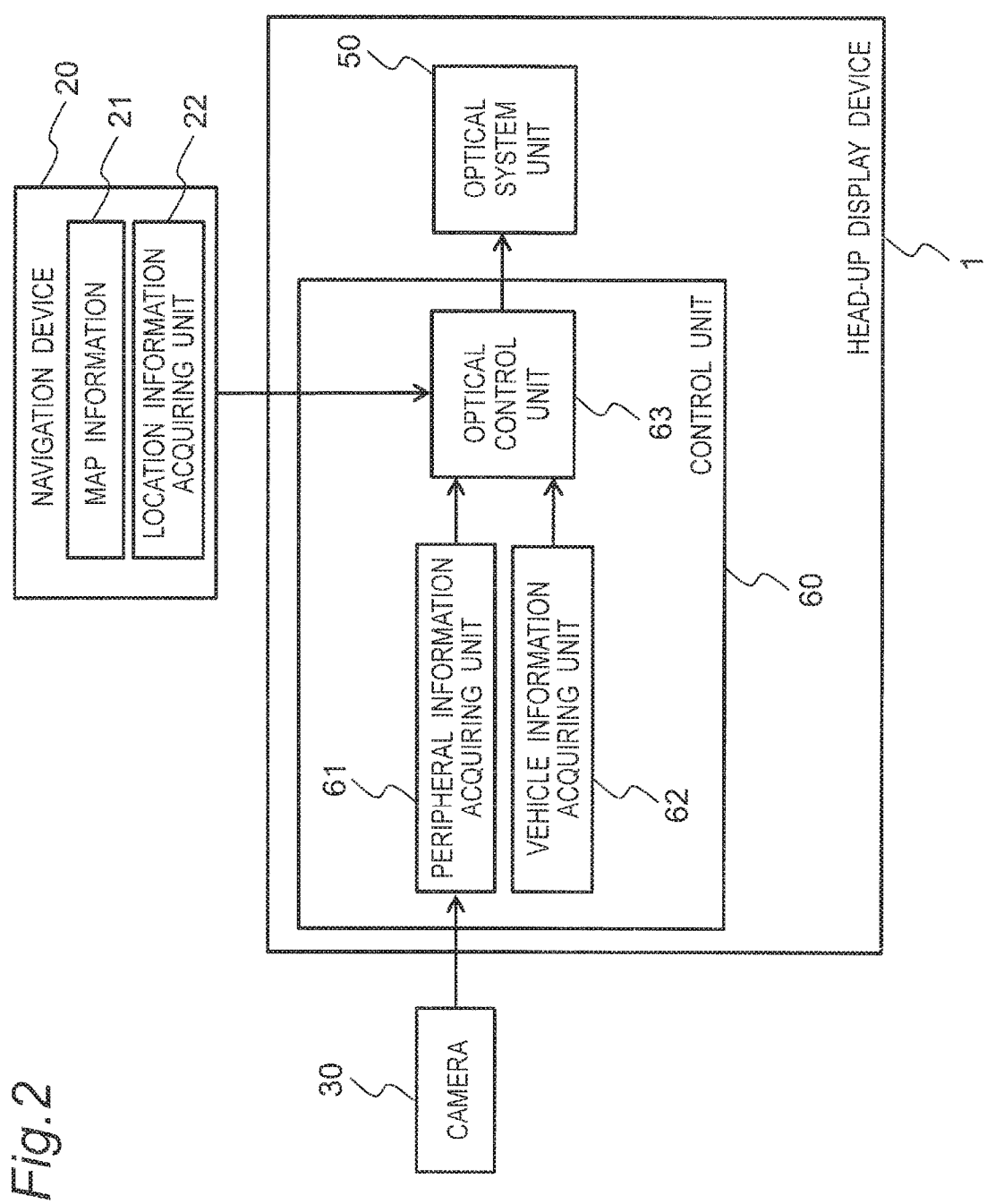
FIG. 2 is a block diagram illustrating an example of a configuration of a head-up display device 1 in an embodiment 1 of the present disclosure.

FIG. 2 is a block diagram illustrating an example of a configuration of the head-up display device 1 in the embodiment 1 of the present disclosure.

The head-up display device 1 includes an optical system unit 50 and a control unit 60.

The control unit 60 is formed of a CPU or an MPU, for example, to execute a program stored in a memory, so that various functions are achieved. The control unit 60 may be formed of a hardware circuit (e.g. ASIC and FPGA), such as exclusively designed electronic circuit, and an electronic circuit that can be reconfigured. Functions of the control unit 60 may be achieved by cooperation of hardware and software, or may be achieved by only hardware (electronic circuit).

The control unit 60 includes a peripheral information acquiring unit 61, a vehicle information acquiring unit 62, and an optical control unit 63.

The peripheral information acquiring unit 61 detects a peripheral building and scene, and an object on a road surface by analyzing image information ahead of a vehicle from the camera 30 to acquire information on a distance from the vehicle itself to the building or the object. The object on a road surface is an intersection, for example.

The vehicle information acquiring unit 62 acquires speed information from various sensors of the vehicle.

The optical control unit 63 extracts a peripheral building and scene, and an object on a road surface on the basis of map information from the navigation device 20. The optical control unit 63 acquires information on a distance from the vehicle to the building or the object on the basis of location information on the vehicle and map information from the navigation device 20. Then, the optical control unit 63 causes the optical system unit 50 to project a virtual image 190 such that the virtual image 190 is positioned near the building or the object, on the basis of the acquired information on the distance. This enables facility information to be projected near a building or enables route guidance information to be projected near an intersection, as information of the navigation device 20, for example.

Alternatively, the optical control unit 63 may cause the optical system unit 50 to project a virtual image 190 such that the virtual image 190 is positioned near a building or an object on the basis of information on a distance from the vehicle itself to the building or the object from the peripheral information acquiring unit 61.

In addition, the optical control unit 63 may set a projection position of the virtual linage 190 on the basis of speed information on the vehicle from the vehicle information acquiring unit 62. For example, a projection position of the virtual image 190 may be set such that the virtual image is projected far when a vehicle travels at high speed and a driver's eye point is on a far side, and that the virtual image is projected closely when the vehicle travels at low speed and the driver's eye point is on a near side.

The optical system unit 50 includes an optical system for projecting a virtual image. The optical system unit 50 of the head-up display device 1 will be described below with reference to FIGS. 3 and 4. In the head-up display device 1 illustrated in FIGS. 3 and 4, only the optical system unit 50 is illustrated and the control unit 60 is eliminated (the same applies to embodiments 2 to 8).

[1-1-3. Structure of Head-Up Display Device (Optical System Unit)]

Figure 3:
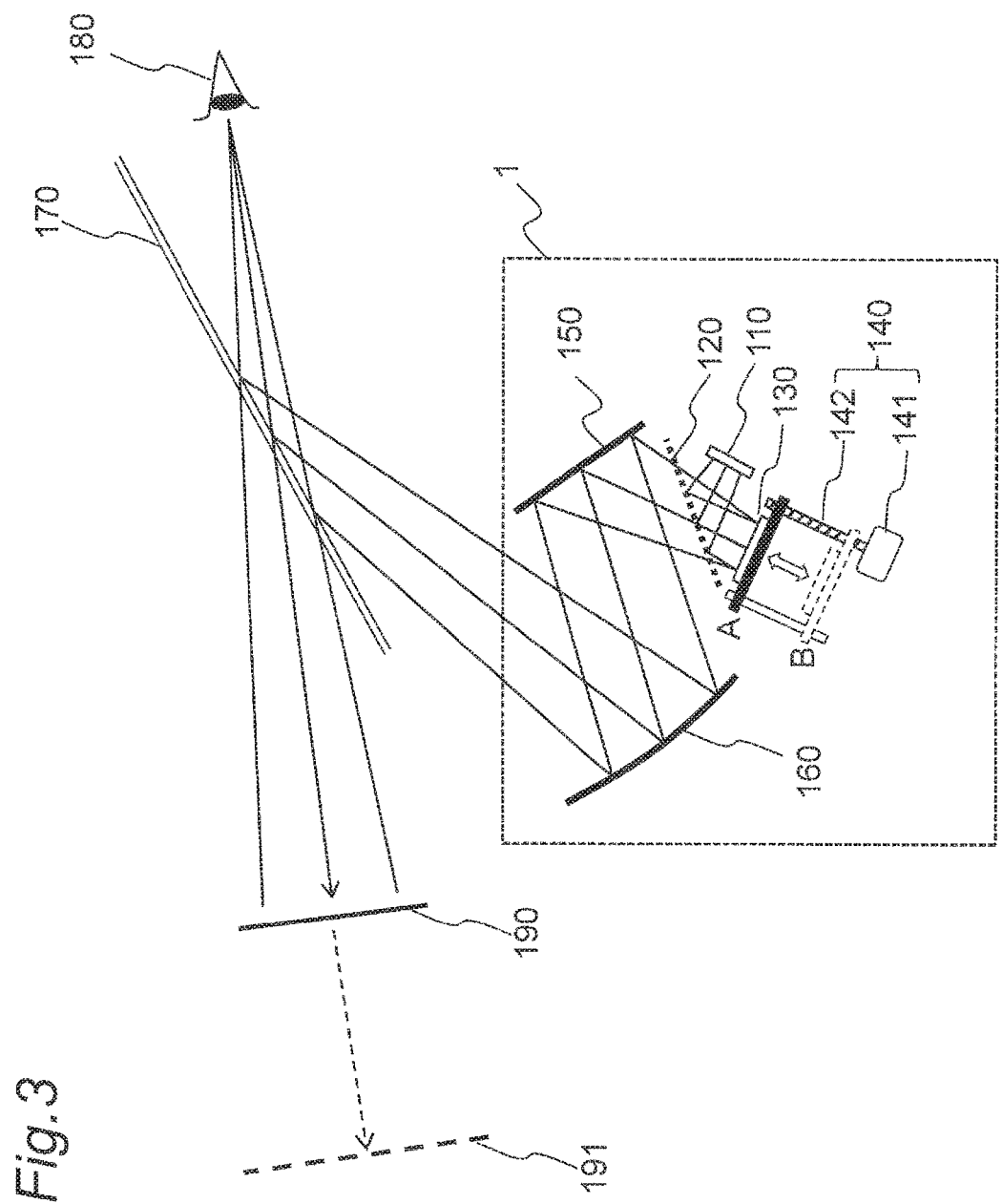
FIG. 3 illustrates an example of a structure of an optical system unit of the head-up display device in the embodiment 1 of the FIG. 4 illustrates a relationship between the amount of movement of a movable mirror and a virtual image distance.

FIG. 3 illustrates an example of a structure of the optical system unit 50 of the head-up display device 1 in the embodiment 1 of the present disclosure.

The head-up display device 1 of the embodiment 1 includes a display element 110, a beam splitter 120 serving as a light separator, a movable mirror 130, a movable unit 140 serving as an adjuster, a first mirror 150, and a second mirror 160. The movable unit 140 includes a motor 141, and a feed screw 142. The movable mirror 130 corresponds to the first optical member, and the first mirror 150 and the second mirror 160 correspond to the second optical member.

The display element 110 is a display that emits light (image light) that forms a display image such as driving information and route information, which are displayed for a driver. The display element 110 is a liquid crystal display module, for example, and includes a liquid crystal display panel, a liquid crystal display panel drive circuit board, a light guide plate, a lens, a diffuser plate, a backlight, a backlight heat sink, and the like.

The beam splitter 120 reflects image light emitted from the display element 110 toward the movable mirror 130, and allows the image light incident from the movable mirror 130 to be transmitted through the beam splitter 120.

The movable mirror 130 reflects image light incident from the beam splitter 120 toward the beam splitter 120. The movable mirror is a plane mirror, for example.

The movable unit 140 changes a distance between the movable mirror 130 and the beam splitter 120 to adjust a projection distance of a virtual image. As illustrated in FIG. 3, the movable unit 140 allows the movable mirror 130 to move parallel to itself between a position A and a position B. This movement enables a distance between the movable mirror 130 and the beam splitter 120 to be changed. The motor 141 of the movable unit 140 is controlled by the control unit 60 on the basis of a detection signal from each of the various sensors of the vehicle, described above, and operation information output from the navigation device 20, for example. The feed screw 142 is rotationally driven by the motor 141. The movable unit 140 adjusts a distance between the movable mirror 130 and the beam splitter 120 by rotating the feed screw 142.

The first mirror 150 reflects image light transmitted through the beam splitter 120 toward the second mirror 160. In the present disclosure, the first mirror 150 is a plane mirror.

The second mirror 160 projects image light reflected off the first mirror 150, as a virtual image, ahead of the windshield 170 of the vehicle as viewed from a driver. The second mirror 160 is a spherical concave mirror, for example, and reflects and condenses image light from the first mirror 150 to project a virtual image 190 ahead of driver's eyes 180 through the windshield 170.

[1-2. Operation]

[1-2-1. General Operation]

Operation of the head-up display device 1 in the embodiment 1 will be described.

Image light output from the display element 110 is reflected off the beam splitter 120, and is incident into the movable mirror 130. The movable mirror 130 reflects the incident image light. The reflected image light is incident into the beam splitter 120 again to be transmitted through the beam splitter 120.

The image light transmitted through the beam splitter 120 is reflected off the first mirror 150, and then is condensed by the second mirror 160. The image light condensed by the second mirror 160 is reflected off the windshield 170 to reach the driver's eyes 180.

The driver's eyes 180 visually identify an image or a picture from the display element 110 far ahead of the windshield 170 as a virtual image 190.

A distance from the driver's eyes 180 to the virtual image 190 (hereinafter referred to as a virtual image distance) can be changed when the movable unit 140 allows the movable mirror 130 to move parallel to itself between the position A and the position B to adjust a distance between the movable mirror 130 and the beam splitter 120, and thus the distance can be changed between the virtual image 190 and a virtual image 191, for example.

An interval between the movable mirror 130 and the beam splitter 120 is set by the control unit 60 described above on the basis of location information on the vehicle, map information, and virtual image 190 can be visually identified in a front scene, for example.

The interval between the movable mirror 130 and the beam splitter 120 may be set by the control unit 60 on the basis of information from various sensors of the vehicle and vehicle speed information. For example, the interval between the movable mirror 130 and the beam splitter 120 is set such that the virtual image is projected far when the vehicle travels at high speed and a driver's eye point is on a far side, and that the virtual image is projected closely when the vehicle travels at low speed and the driver's eye point is on a near side. This enables movement of a driver's eye point to be reduced.

[1-2-2. Adjustment of Virtual Image Distance]

Figure 4:
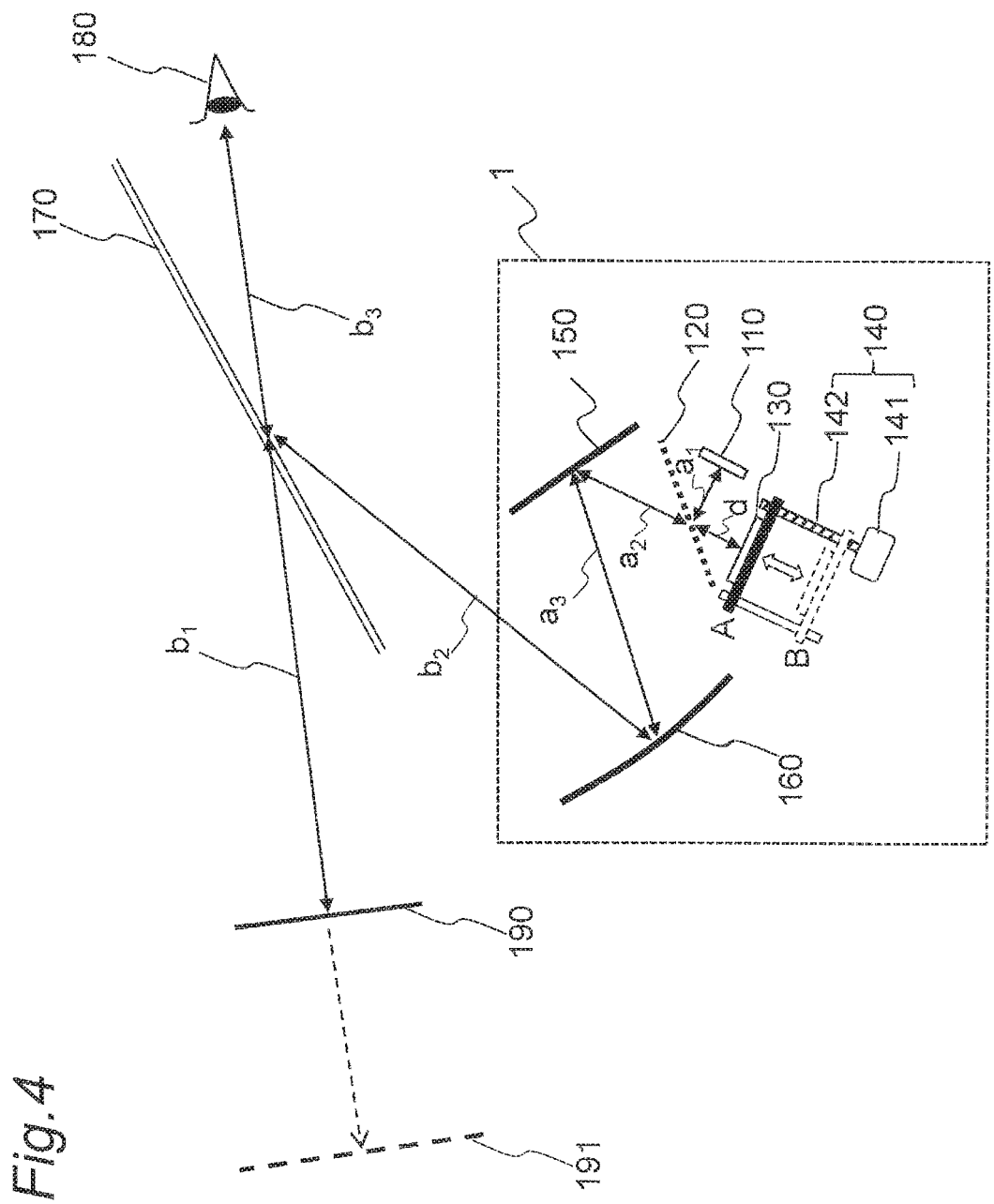

FIG. 4 illustrates a relationship between the amount of movement of the movable mirror 120 and a virtual image distance.

In FIG. 4, a distance from the display element 110 to the second mirror 160, through which image light is transmitted, is designated as "a". As illustrated in FIG. 4, when a distance from the display element 110 to the beam splitter 120 is designated as "a1", a distance from the beam splitter 120 to the movable mirror 130 is designated as "d", a distance from the beam splitter 120 to the first mirror 150 is designated as "a2", and a distance from the first mirror 150 to the second mirror 160 is designated as "a3", "a" is expressed by Expression 1.

$$a = a_1 + a_2 + 2d + a_3 \quad \text{[Expression 1]}$$

In addition, a distance from the second mirror 160 to the virtual image 190, through which image light is transmitted, is designated as "b". As illustrated in FIG. 4, when a distance from the second mirror 160 to the windshield 170 is designated as "b2", and a distance from the windshield 170 to the virtual image 190 is designated as "b1", "b" is expressed by Expression 2.

$$b = b_1 + b_2 \quad \text{[Expression 2]}$$

When a curvature radius of the second mirror 160 is designated as "R", the distances "a" and "b", and "R" have a relationship expressed by Expression 3.

$$\frac{1}{a} - \frac{1}{b} = \frac{2}{R} \quad \text{[Expression 3]}$$

Where "a" and "b" each are an absolute value, a sigh of 1/b is negative to satisfy a virtual image display condition.

In addition, when a distance from the driver's eyes 180 to the windshield 170 is designated as "b3", a virtual image distance "L" from the driver's eyes 180 to the virtual image 190 is expressed by Expression 4.

$$L = b_1 + b_3 \quad \text{[Expression 4]}$$

The curvature radius R of the second mirror 160 is a fixed value, so that increase in the distance "d" increases the distance "a" and the distance "b" according to Expressions 1 to 3.

Thus, when the distance "b3" from the driver's eyes 180 to the windshield 170 is constant, increase in the distance "d" increases the virtual image distance "L".

Specifically, when the movable mirror 130 is shifted from the position A to the position B, for example, a distance between the movable mirror 130 and the beam splitter 120 increases to increase the distance "d", and thus the virtual image 190 moves to the virtual image 191.

Image light travels back and forth once between the beam splitter 120 and the movable mirror 130. Thus, when the distance "d" is changed by "d1", for example, the distance "a" increases by twice "d1" according to Expression 1.

As described above, the movable mirror 130 being a movable body is disposed in a space where image light travels back and forth, so that moving the movable mirror 130 by only one-half of a desired variation of the distance "a" enables a target change in virtual image distance to be acquired. This enables reduction in the entire size of the head-up display device 1.

As a specific example, there is considered an optical system of a head-up display in which a virtual image distance can be changed within a range from 2 m to 100 m, for example.

In Expressions 1 to 4, when R is 600 mm, a1 is 20 mm, a2 is 100 mm, a3 is 100 mm, b2 is 200 mm, b3 is 1000 mm, and L is 2 m, d is 10 mm. In addition, when L is 100 m, d is 39.5 mm. Thus, when the virtual image distance "L" is changed within a range from 2 m to 100 m, d1 is 29.5 mm.

In contrast, when the same variable range of a virtual image distance as that of FIG. 4 is achieved in a conventional head-up display device in which a display is movable, a moving range of a display is twice "d1", or 59 mm.

According to a structure of the embodiment 1, a moving range of a movable unit 140 can be reduced by approximately 30 mm as compared with a conventional structure. This enables providing a head-up display device with a small-sized structure.

In the present embodiment, the second mirror 160 is a spherical mirror, and the first mirror 150 is a plane mirror. However, the present disclosure is not limited to the above mirrors, and each or the mirrors may be a spherical concave mirror, a spherical convex mirror, a non-spherical concave mirror, a non-spherical convex mirror, or a free-form surface mirror.

[1-3. Summary]

As described above, in the present embodiment, the head-up display device 1 includes the display element 110, the beam splitter 120, the movable mirror 130, the first and second mirrors 150 and 160, and the movable unit 140. The display element 110 emits image light to form a display image. The beam splitter 120 is an element that reflects image light or allows image light to be transmitted through the element, and reflects image light emitted from the display element 110. The movable mirror 130 reflects image light reflected off the beam splitter 120. The first and second mirrors 150 and 160 each reflect image light transmitted through the beam splitter 120 after reflected off the movable mirror 130 to project the virtual image 190. The movable unit 140 adjusts a distance between the movable mirror 130 and the beam splitter 120 to adjust a projection distance of the virtual image 190.

In the head-up display device 1, the image light emitted from the display element 110 is reflected off the beam splitter 120, reflected off the movable mirror 130 and incident into the beam splitter 120 again. The image light incident into the beam splitter 120 is transmitted through the beam splitter 120 to be reflected off the first mirror 150, and then is condensed by the second mirror 160. The condensed image light is reflected off the windshield 170 to reach the driver's eyes 180. The movable unit 140 changes a distance between the movable mirror 130 and the beam splitter 120 to adjust a projection distance of a virtual image. This allows the movable unit 140 to shift the movable mirror 130, so that a virtual image existance can be changed.

Conventionally, there is known a head-up display device that adjusts a position of a display element to adjust a projection distance of a virtual image. The display element has a high heating value, so that a heat sink needs to be provided, and thus is heavy. Thus, it is difficult to move the display element at high speed. As a result, it is difficult to change a projection distance of the virtual image 190 at high speed.

In contrast, in the present embodiment, the movable mirror 130 lighter than the display element 110 provided with a heat sink is moved, so that the movable mirror 130 can be moved at relatively nigh speed. Thus, a projection distance of the virtual image 190 can be changed at relatively high speed.

The movable mirror 130 being a movable body is disposed in a space where image light travels back and forth, so that a moving range of a movable unit can be reduced as compared with a conventional structure. This enables providing a head-up display device with a small-sized structure.

The movable mirror 130 is positioned near the display element 110. That is, the movable mirror 130 is disposed in a region where a beam of light from the display element 110 is relatively small in width. Thus, the movable mirror 130 is relatively small in width and light in weight as compared with the second mirror 160 and the first mirror 150. As a result, a less load is applied to the movable unit 140 when the movable mirror 130 is shifted, so that the movable mirror 130 can be moved at high speed to quickly change a virtual image distance.

This enables providing a head-up display device with a small-sized structure, capable of changing a projection display distance of a virtual image at high speed.

In the present embodiment, the second mirror 160 is a spherical mirror, and the first mirror 150 is a plane mirror. However, the present disclosure is not limited to the above mirrors, and each of the mirrors may be a spherical concave mirror, a spherical convex mirror, a non-spherical concave mirror, a non-spherical convex mirror, or a free-form surface mirror.

This enables an aberration of an optical system to be corrected by the less number of mirrors, so that a head-up display device with a small-sized structure can be provided.

The display element 110 is a liquid crystal display element. Thus, when a liquid crystal display element that is easily available at a low cost is used as the display element, for example, an inexpensive head-up display device can be provided.

The movable unit 140 adjusts a distance between the movable mirror 130 and the beam splitter 120 according to location information on the vehicle to adjust a projection distance of a virtual image. This enables providing a head-up display device capable of projecting a virtual image on a peripheral building and scene, or a road surface, in coordination with the location information on the vehicle and information from the navigation device, for example.

The movable unit 140 also adjusts a projection distance of a virtual image according to travel information on the vehicle. Accordingly, for example, when a vehicle travels at high speed and a driver's eye point is on a far side, a virtual image can be projected far. When the vehicle travels at low speed and the driver's eye point is on a near side, the virtual image can be projected closely. This enables providing a head-up display device with high visibility, causing less movement of a driver's eye point.

(Embodiment 2)

[2-1. Structure]

Figure 5:
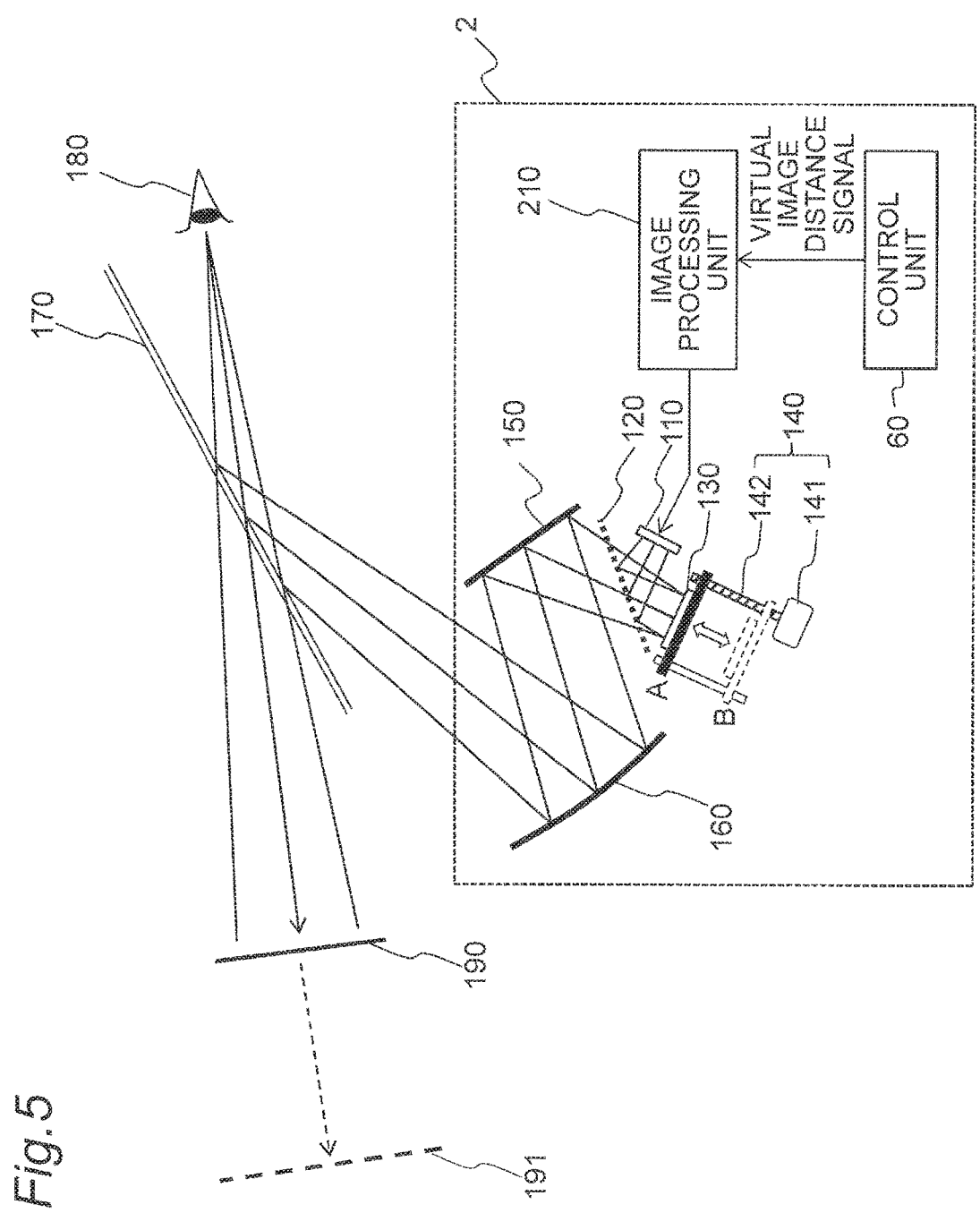
FIG. 5 illustrates an example of a structure of a head-up display device 2 in an embodiment 2 of the present disclosure.

FIG. 5 illustrates an example of a structure of a head-up display device 2 in an embodiment 2 of the present disclosure. In FIG. 5, the component same as that of FIG. 3, as well as a component performing the same operation as that of FIG. 3 is designated as the same reference numeral to eliminate duplicated description.

Unlike the structure of FIG. 3, the structure of FIG. 5 includes an image processing unit 210 for adjusting an image or a picture to be displayed in a display element 110.

The image processing unit 210 adjusts display magnification of an image or a picture to be displayed in the display element 110 in synchronization with a virtual image distance signal received from a control unit 60, and outputs the image or the picture to the display element 110. The image processing unit 210 may be fabricated in the control unit 60 described above, or may be fabricated along with the control unit 60.

[2-2. Operation]

In the structure of the embodiment 1, a magnification M of a virtual image projected, against an image or a picture in the display element 110, can be acquired by Expression 5 according to Expressions 2 to 4.

$$M = \frac{b}{a} = \frac{2}{R}(L + b_2 - b_3) + 1 \qquad \text{[Expression 5]}$$

Where R, $b_2$, and $b_3$ are constant, the magnification M of a virtual image projected changes in proportion to a virtual image distance L and $2/R$.

Thus, Expression 5 expresses a field angle of a virtual image visually identified by a driver that changes in accordance with change in the virtual image distance L. That is, Expression 5 expresses a virtual image at any distance as viewed from a driver that changes in apparent size in accordance with change in the virtual image distance L.

In an actual head-up display device, there is a problem in which a spherical mirror 160 is relatively large in size, so that large distortion may be caused in a virtual image visually identified by a driver when a virtual image distance is changed. That is, there is a problem of causing distortion aberration.

The distortion aberration distorts a virtual image to cause a substantial size of the virtual image to enlarge or contract, so that the virtual image is further changed in apparent size when a virtual image distance is changed.

From the point described above, there is a problem in which a virtual image changes in apparent size when a virtual image distance is changed while the same image or picture is visually identified, so that it becomes difficult to visually identify the virtual image.

The structure of FIG. 5 solves the problems described above. The head-up display device 2 receives a virtual image distance signal in synchronization with location information on the movable mirror 130, and the image processing unit 210 enlarges or contracts an image to be displayed in the display element 110 in accordance with a virtual image distance indicated, by the virtual image distance signal. The virtual image distance signal is created by the control unit 60 on the basis of the amount of movement of the movable mirror 130, or the amount of adjustment of a projection distance of the virtual image. This enables a size of the virtual image at any distance as viewed from a driver to be constant even if the virtual image distance changes.

The aforementioned distortion of a virtual image, caused by change in a virtual image distance, can be corrected by intentionally distorting an image to be displayed in the display element 110 in a direction opposite to the distortion of the virtual image in accordance with the amount of correction that is previously acquired. Thus, when the image processing unit 210 distorts an image to be displayed in the display element 110 through the signal, a shape of a virtual image at any distance as viewed from a driver can be constant, and thus distortion of a virtual image projected can be reduced.

Other structure and operation are similar to those of the embodiment 1, so that detailed description thereof is eliminated.

[2-3. Summary]

In the head-up display device 2 of the embodiment 2, the image processing unit 210 adjusts display magnification of a display image in accordance with a projection distance of a virtual image.

This enables change of a virtual image in size when a projection distance of the virtual image is changed to be corrected through image processing, for example, so that it is possible to provide a head-up display device that displays a virtual image with high visibility.

In the head-up display device 2 of the embodiment 2, the image processing unit 210 also corrects image distortion of a display image in accordance with a projection distance of a virtual image.

This enables distortion of a virtual image when a projection distance of the virtual image is changed to be corrected through image processing, for example, so that it is possible to provide a head-up display device that displays a virtual image with high visibility.

In the present embodiment, the image processing unit 210 adjusts display magnification of a display image such that a virtual image is constant in size even if a virtual image distance is changed. However, the image processing unit 210 may adjust display magnification of a display linage such that a virtual image is changed in size in accordance with a virtual image distance. For example, the image processing unit 210 enlarges or contracts an image to be displayed in the display element 110 such that a virtual image decreases in size when a virtual image distance is long and the virtual image increases in size when the virtual image distance is short. As described above, visibility of a virtual image can be increased by using perspective instead of allowing the virtual image to be constant in size.

(Embodiment 3)

[3-1. Structure]

Figure 6:
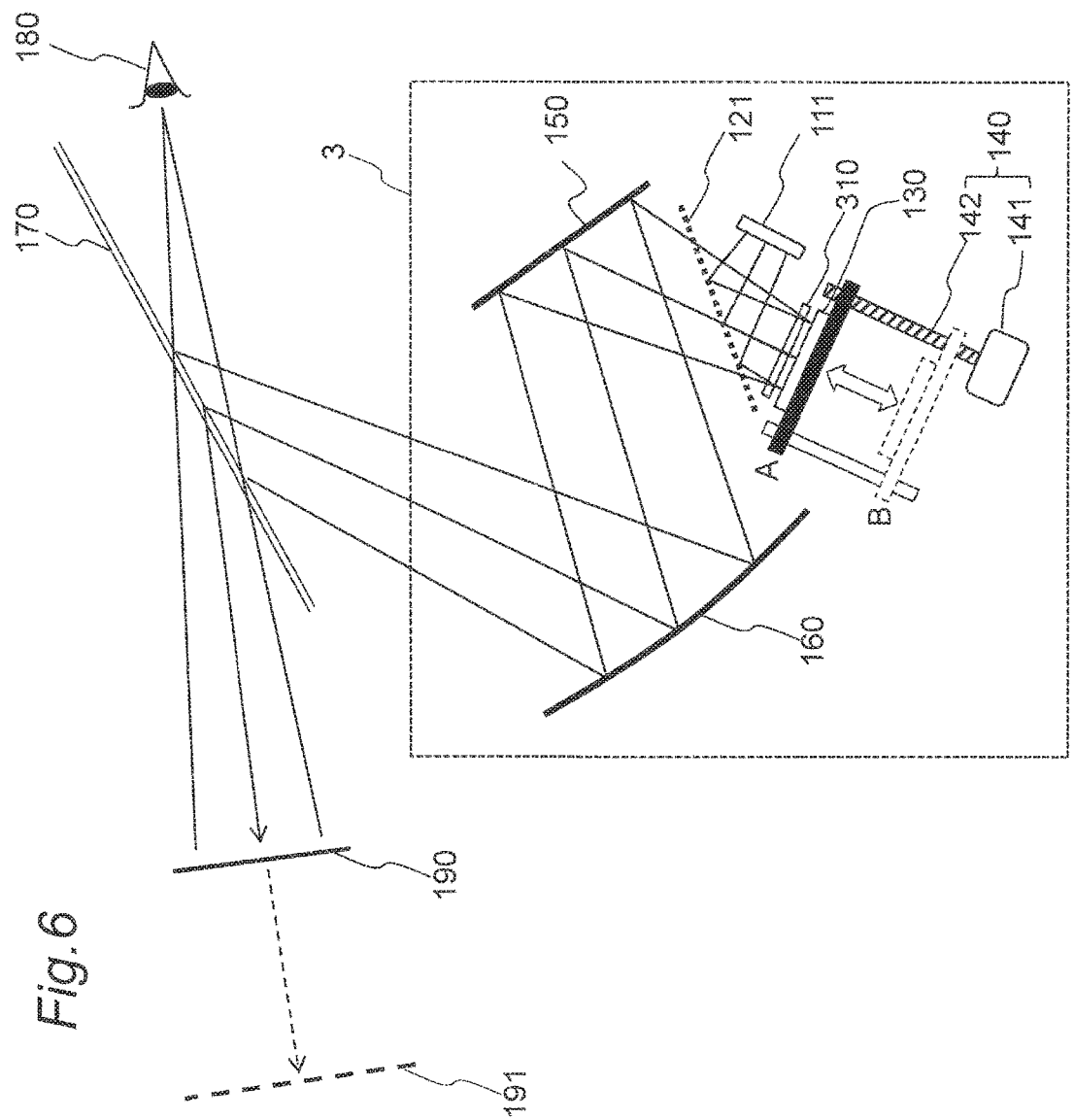
FIG. 6 illustrates an example of a structure of an optical system unit of the head-up display device in an embodiment 3 of the present disclosure.

FIG. 6 illustrates an example of a structure of an optical system unit 50 of a head-up display device 3 in an embodiment 3 of the present disclosure.

The head-up display device 3 of the embodiment 3 includes a display element 111, a reflection-type polarization beam splitter 121 serving as a light separator, a movable mirror 130, a movable unit 140, a first mirror 150, a second mirror 160, and a quarter-wave plate 310. In FIG. 6, the component same as that of FIG. 3, as well as a component performing the same operation as that of FIG. 3 is designated as the same reference numeral to eliminate duplicated description.

In the present embodiment 3, linear polarization light in a polarization direction parallel to an incident surface of the reflection type polarization beam splitter 121 is indicated as p-polarization light, and linear polarization light in a polarization direction perpendicular to the incident surface thereof is indicated as s-polarization light. Thus, in FIG. 6, a polarization direction of the p-polarization light is parallel to the paper-surface, and a polarization direction of the s-polarization light is perpendicular to the paper-surface. In FIG. 6, the display element 111 is a liquid crystal element that emits p-polarization light, for example.

The reflection type polarization beam splitter 121 reflects image light incident from the display element 111 toward the movable mirror 130, and allows the image light incident from the movable mirror 130 to be transmitted through the reflection type polarization beam splitter 121.

The reflection type polarization beam splitter 121 uses a wire grid polarizing film on which a fine periodic structure of aluminum is formed, for example. As the wavelength plate, a phase difference film, a crystal wavelength plate, and the like are available. The reflection type polarization beam splitter 121 is disposed in a direction allowing p-polarization light to be reflected and s-polarization light to be transmitted therethrough.

The quarter-wave plate 310 is disposed such that a polarization direction of light incident from the display element 111 is to be an azimuth angle of 45 degrees to a high speed axis (or a low speed axis) of the quarter-wave plate 310. The quarter-wave plate 310 is configured to control polarization of light from the display element 111 to increase utilization efficiency of the light from the display element 111.

[3-2. Operation]

Operation of the head-up display device 3 in the embodiment 3 will be described below with reference to FIG. 6.

Image light emitted from the display element 111 is reflected off the reflection type polarization beam splitter 121, and is converted into circular polarization light by being transmitted through the quarter-wave plate 310, and then is totally reflected off the movable mirror 130. The light reflected off the movable mirror 130 is incident into the quarter-wave plate 310 again, and is transmitted through the quarter-wave plate 310. This allows the transmitted light (image light) to be converted into light having a component of s-polarization. After that, the light transmitted through the reflection type polarization beam splitter 121 is reflected off the first mirror 150 to be condensed by the second mirror 160, and then is reflected off a windshield 170 to reach driver's eyes 180.

When an unpolarized beam splitter with an equal split ratio is used as the reflection type polarization beam splitter 121, for example, the amount of reflected light as well as the amount of transmitted light becomes about half and another half is lost when light is reflected off and transmitted through the beam splitter. However, when the reflection type polarization beam splitter 121 and the quarter-wave plate 310 are used to control polarization of light from the display element 111 as with the structure of FIG. 6, it is possible to greatly reduce loss of light.

Other structure and operation are similar to those of the embodiment 1, so that detailed description thereof is eliminated.

[3-3. Example of Another Structure]

Each of a polarization direction in the display element 111, one on a reflection side of the reflection type polarization beam splitter 121, and one on a transmitting side thereof, is not limited to only that described above. When light from the display element 111 is indicated as s-polarization light, for example, the reflection type polarization beam splitter 121 also can be disposed in a direction allowing the s-polarization light to be reflected and the p-polarization light to the transmitted therethrough. An example of this case will be described with reference to FIG. 7.

Figure 7:
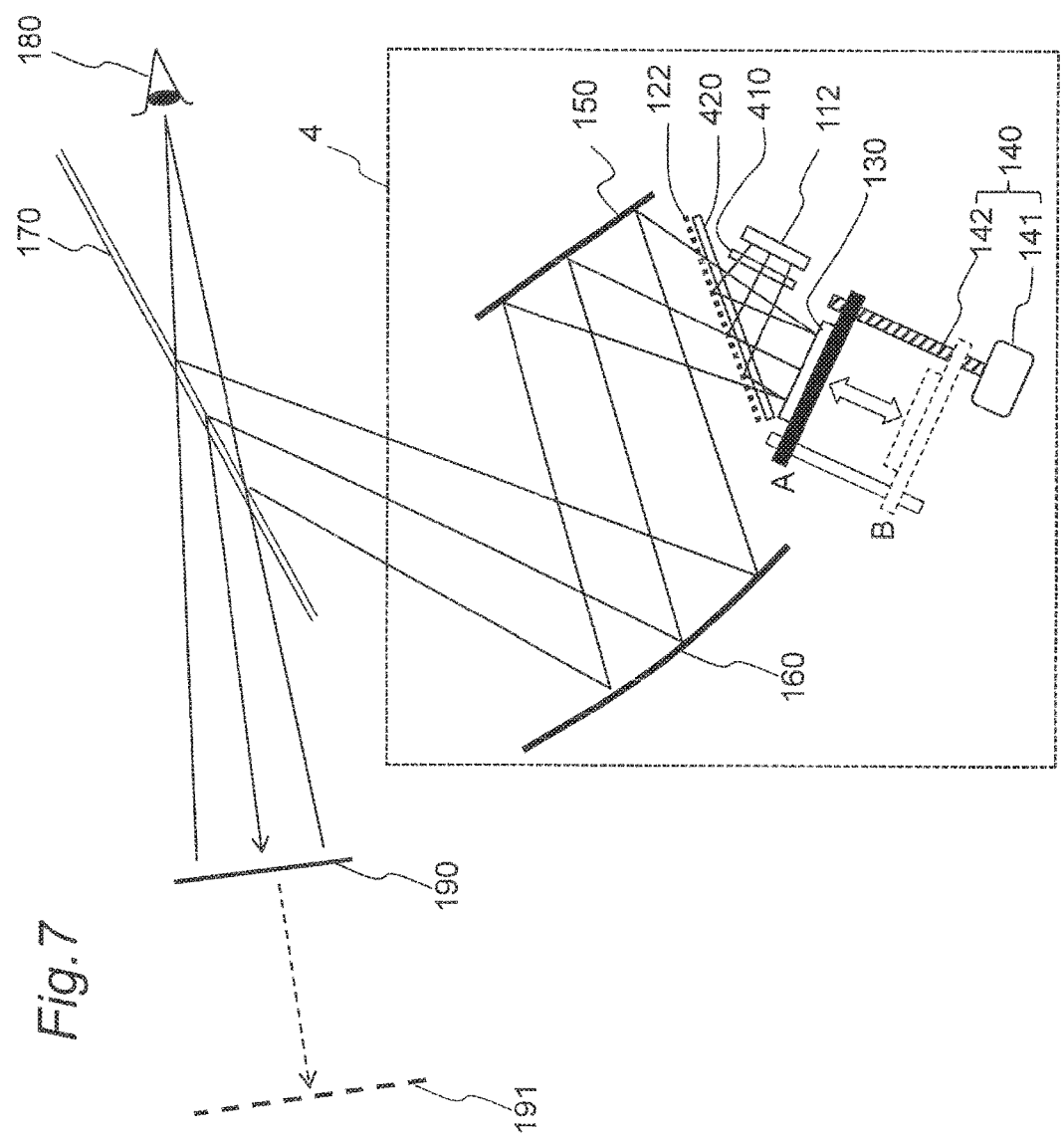
FIG. 7 illustrates an example of a structure of an optical system unit of the head-up display device in the embodiment 3 of the present disclosure.

FIG. 7 illustrates an example of another structure of an optical system unit 50 of a head-up display device 4 in the embodiment 3 of the present disclosure.

The head-up display device 4 includes a display element 112, a reflection type polarization beam splitter 122 serving as a light separator, a movable mirror 130, a movable unit 140, a first mirror 150, a second mirror 160, a first quarter-wave plate 410, and a second quarter-wave plate 420. In FIG. 7, the component same as that of each of FIGS. 3 and 6 is designated as the same reference numeral to eliminate duplicated description.

The display element 112 uses a liquid crystal element that emits s-polarization light, and the reflection type polarization beam splitter 122 is disposed in a direction allowing the s-polarization light to be transmitted and the p-polarization light to be reflected.

Each of the first quarter-wave plate 410 and the second quarter-wave plate 420 is disposed such that a polarization direction of light incident from the display element 111 is to be an azimuth angle of 45 degrees to a high speed axis (or a low speed axis) of each of the first quarter-wave plate 410 and the second quarter-wave plate 420.

As illustrated in FIG. 7, image light including an image or a picture displayed in the display element is converted into circular polarization light by being transmitted through the first quarter-wave plate 410, and is converted into p-polarization light by being transmitted through the second quarter-wave plate 420.

The light transmitted through the second quarter-wave plate 420 is reflected off the reflection type polarization beam splitter 122, and then is transmitted through the second quarter-wave plate 420 again to be converted into circular polarization light.

The light converted into circular polarization light is totally reflected off the movable mirror 130, and is transmitted through the second quarter-wave plate 420 again to be converted into s-polarization light, and then is transmitted through the reflection type polarization beam splitter 122.

The light transmitted through the reflection type polarization beam splitter 122 is reflected off the first mirror 150, and is further condensed by the second mirror 160. The condensed light is reflected off a windshield 170 to reach driver's eyes 180.

[3-4. Summary]

The head-up display device 3 of the embodiment 3 includes the light separator 121 that is a wire grid polarizer, and the quarter-wave plate 310.

The head-up display device 4 includes the light separator 122 that is a wire grid polarizer, the first quarter-wave plate 410, and the second quarter-wave plate 420.

This enables loss of light in a light separator to be reduced, so that a bright head-up display device with high visibility can be provided.

(Embodiment 4)

[4-1. Structure]

Figure 8:
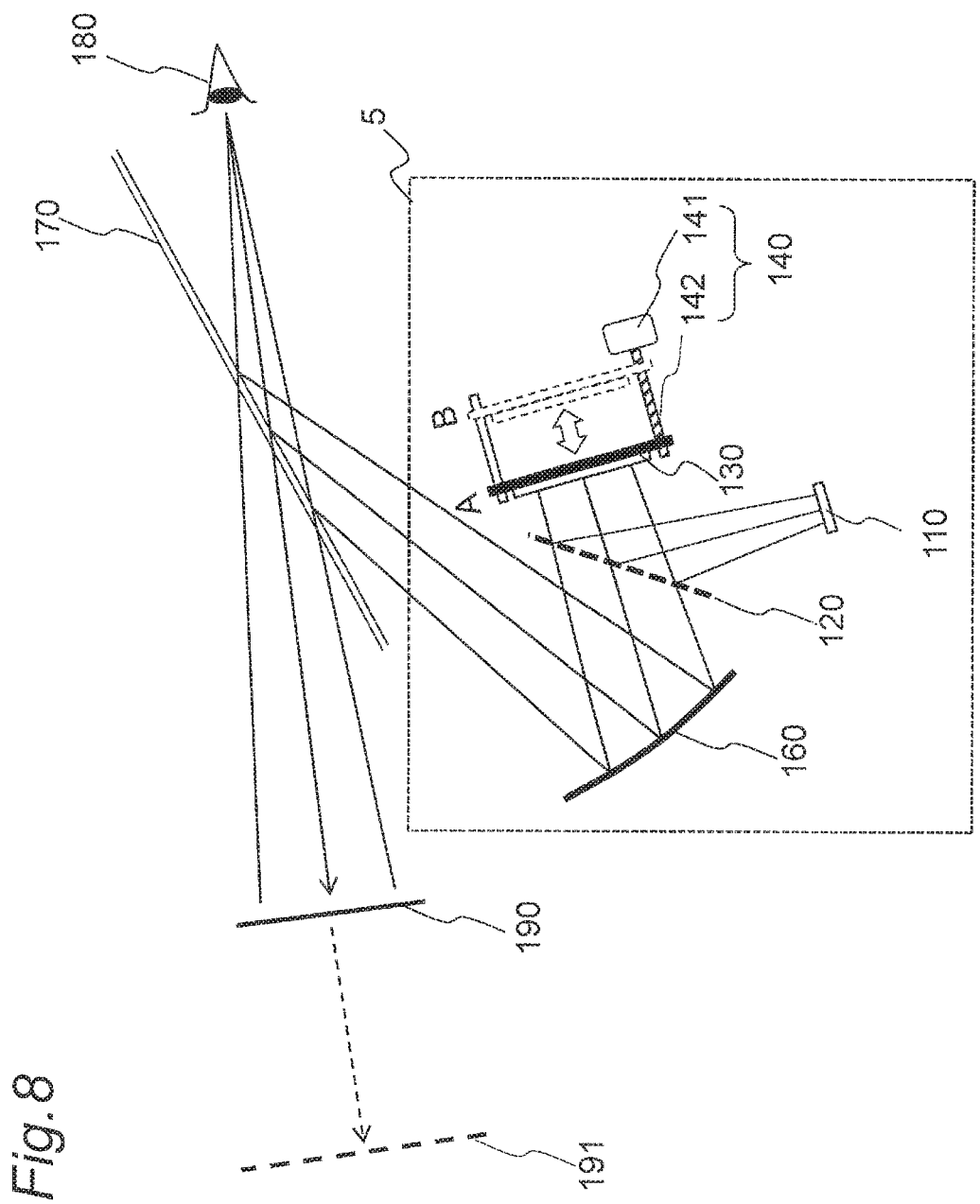
FIG. 8 illustrates an example of a structure of an optical system unit of a head-up display device in an embodiment 4 of the present disclosure.

FIG. 8 illustrates an example of a structure of an optical system unit 50 of a head-up display device 5 in an embodiment 4 of the present disclosure. In FIG. 8, the component same as that of FIG. 3 is designated as the same reference numeral to eliminate duplicated description.

Unlike the structure of FIG. 3, the structure of FIG. 8 is configured to eliminate a first mirror 150 to further reduce a size of the entire optical system.

[4-2. Operation]

In FIG. 8, image light including an image or a picture, displayed in a display element 110, is reflected off a beam splitter 120, and is further reflected off a movable mirror 130, and then is transmitted through the beam splitter 120. The image light transmitted through the beam splitter 120 is condensed by a second mirror 160, and is reflected off a windshield 170 of a vehicle to reach driver's eyes 180. The driver's eyes 180 visually identify an image or a picture displayed in the display element 110 far ahead of the windshield 170 as a virtual image 190.

As with the embodiment 3, a reflection type polarization beam splitter may be used as the beam splitter 120 and a quarter-wave plate may be disposed between the beam splitter 120 and the movable mirror 130 to increase utilization efficiency of light from the display element 110.

Other structure and operation are similar to those of the embodiment 1, so that detailed description thereof is eliminated.

(Embodiment 5)

[5-1. Structure]

Figure 9:
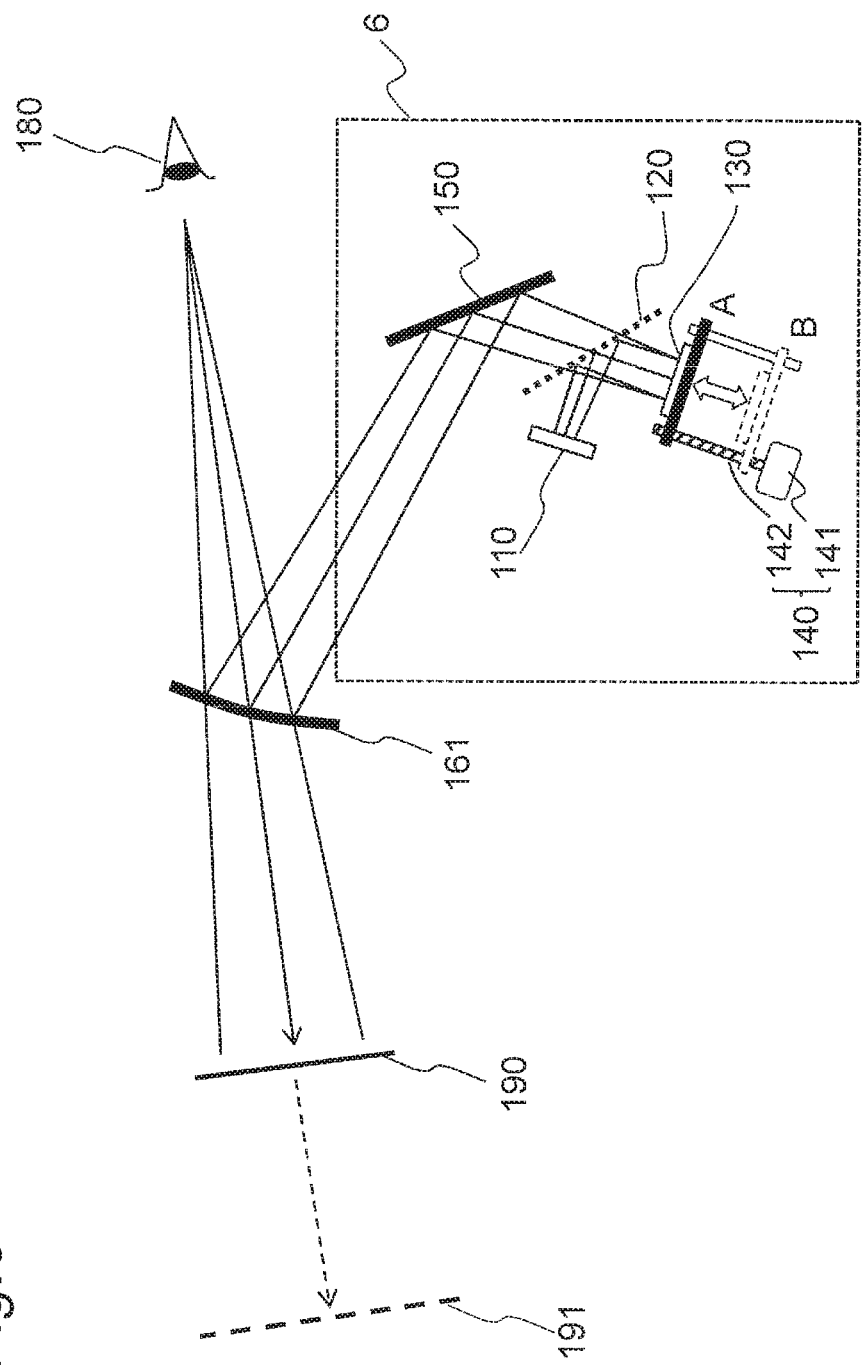
FIG. 9 illustrates an example of a structure of an optical system unit of a head-up display device in an embodiment 5 of the present disclosure.

FIG. 9 illustrates an example of a structure of an optical system unit 50 of a head-up display device 6 in an embodiment 5 of the present disclosure.

Unlike the structure of FIG. 3, the structure of FIG. 9 is configured to provide a combiner mirror 161 separately from a windshield so that the combiner mirror 161 reflects an image or a picture displayed in a display element 110 to project the image or the picture far ahead of the combiner mirror 161 as a virtual image.

[5-2. Operation]

In FIG. 9, image light including an image or a picture, displayed in the display element 110, is reflected off a beam splitter 120, and is further reflected off a movable mirror 130, and then is transmitted through the beam splitter 120. The image light transmitted through the beam splitter 120 is reflected off a first mirror 150, and is reflected off and condensed by the combiner mirror 161 to reach driver's eyes.

The driver's eyes 180 visually identify an image or a picture displayed in the display element 110 far ahead of the combiner mirror 161 as a virtual image 190.

Other structure and operation are similar to those of the embodiment 1, so that detailed description thereof is eliminated.

(Embodiment 6)

[6-1. Structure]

Figure 10:
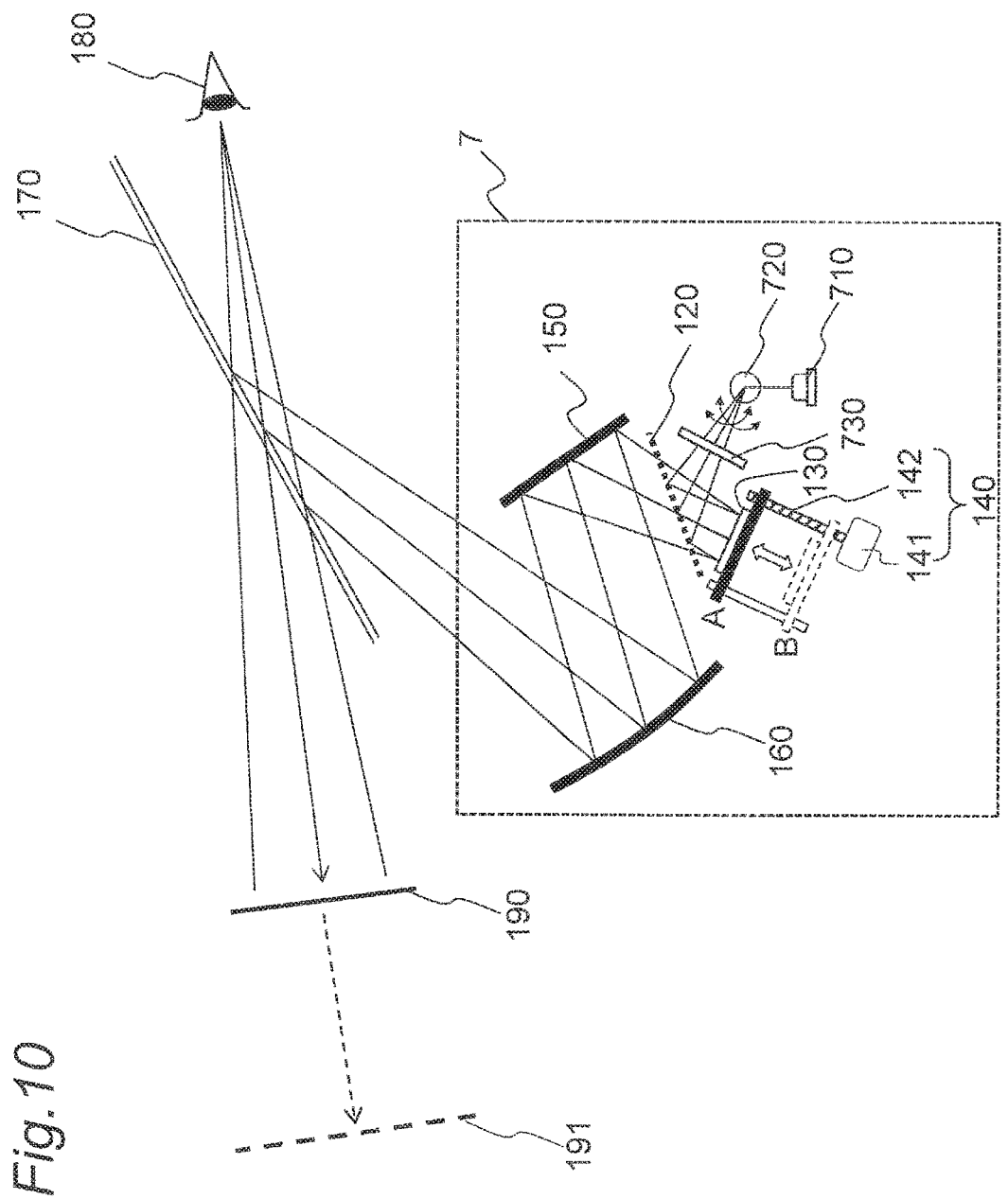
FIG. 10 illustrates an example of a structure of an optical system unit of a head-up display device in an embodiment 6 of the present disclosure.

FIG. 10 illustrates an example of a structure of an optical system unit 50 of a head-up display device 7 in an embodiment 6 of the present disclosure.

In FIG. 10, the component same as that of FIG. 3 is description. Unlike the structure of FIG. 3, the structure of FIG. 10 is configured to use a laser projector that scans a laser beam for projection display on a screen, as a display element.

The head-up display device 7 includes a laser beam source 710, a scan unit 720, and a screen 730, instead of the display element 110 of the head-up display device 1.

The laser beam source 710 includes three laser elements of red, blue, and green, for example. The scan unit 720 scans a beam from the laser beam source 710 by deflecting the beam in a two-dimensional manner.

For the screen 730, a Fresnel screen, a diffusing screen, a screen formed by combining a Fresnel lens and a diffuser plate, or the like is used.

[6-2. Operation]

In FIG. 10, light emitted from the laser beam source 710 is scanned on the screen 730 in a two-dimensional manner by the scan unit 720, so that an image or a picture is displayed on the screen 730. Image light including the image or the picture on the screen 730 is reflected off a beam splitter 120, and is further reflected off a movable mirror 130, and then is transmitted through the beam splitter 120.

The image light transmitted through the beam splitter 120 is reflected off a first mirror 150 and is reflected off and condensed by a second mirror 160. The condensed image light reaches driver's eyes 180 after being reflected off a windshield 170.

The driver's eyes 180 visually identify the image or the picture displayed on the screen 730 far ahead of the windshield 170 as a virtual image 190.

As with FIG. 3, when the movable mirror 130 is moved to change a virtual image distance in the structure of FIG. 10, a field angle of a virtual image is changed, as described in the embodiment 2.

Unlike the embodiment 2, a field angle can be maintained constant by changing a deflection angle of the scan unit 720 in accordance with a virtual image distance in the present embodiment 6.

Using laser elements of three respective colors of red, blue, and green enables a full-color virtual image to be displayed. Besides this, in the present disclosure, a laser element for one color, two colors, or four colors or more, is available.

Other structure and operation are similar to those of the embodiment 1, so that detailed description thereof is eliminated.

[6-3. Summary]

The head-up display device 7 of the embodiment 6 includes the scan unit 720 that scans light emitted from a plurality of laser beam sources 710, and the screen 730 on which scanned light from the scan unit 720 forms an image.

This enables providing a head-up display device with a bright display screen because a laser beam source has high luminance, for example.

(Embodiment 7)

[7-1. Structure]

Figure 11:
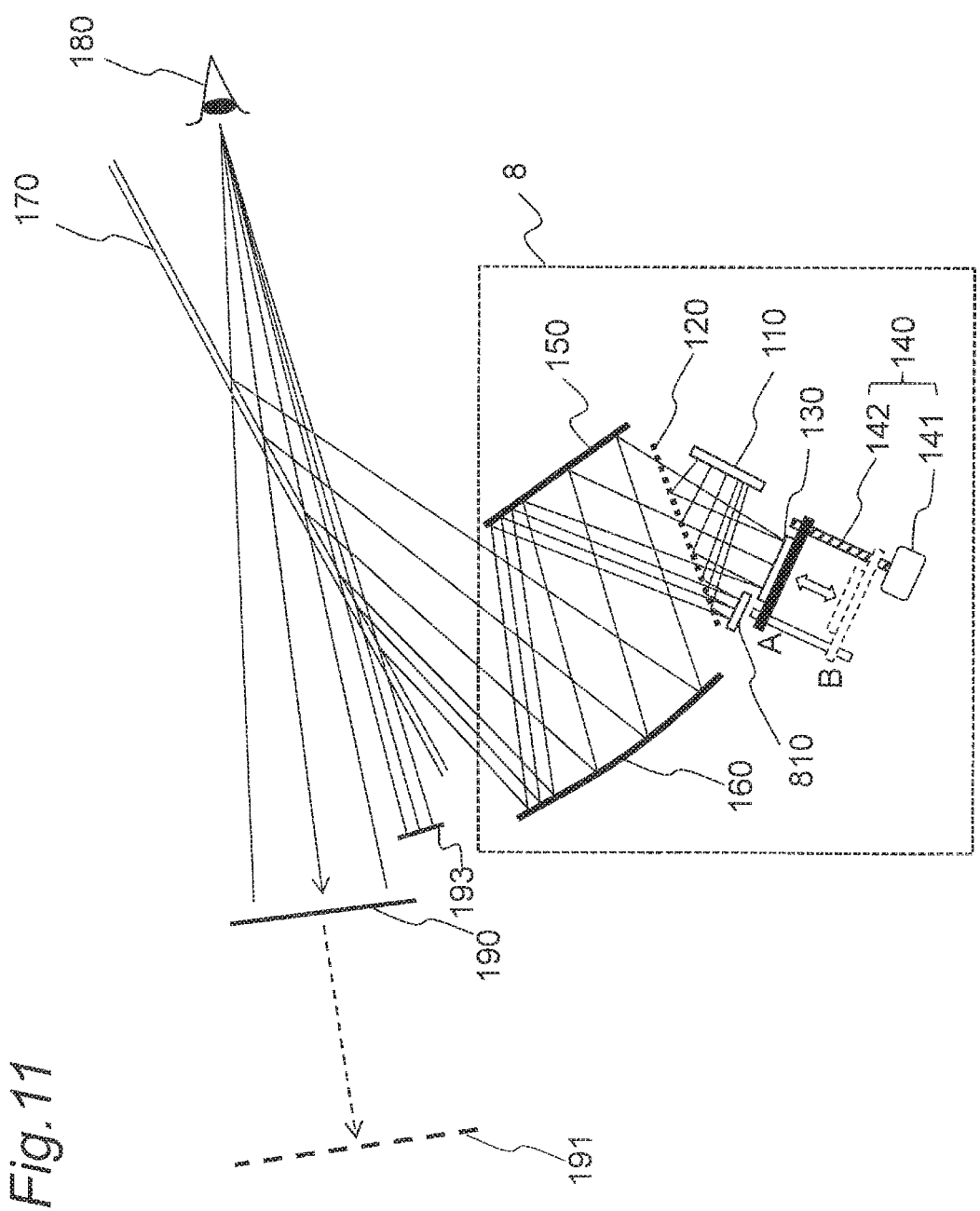
FIG. 11 illustrates an example of a structure of an optical system unit of a head-up display device in an embodiment 7 of the present disclosure.

FIG. 11 illustrates an example of a structure of an optical system unit 50 of a head-up display device 8 in an embodiment 7 of the present disclosure.

The head-up display device 8 illustrated in FIG. 11 further includes a reflection mirror 810 in addition to the structure of FIG. 3. That is, in the head-up display device 8 of the present embodiment, an optical system that displays two virtual images each having a different virtual image distance is disposed in one device. A position of the reflection mirror 810 is fixed.

[7-2. Operation]

As with FIG. 3, in the structure illustrated in FIG. 11, first image light including an image or a picture displayed in some regions of a display element 110 is reflected off a beam splitter 120 and a movable mirror 130, or is transmitted therethrough, to be reflected off a first mirror 150, and then is condensed by a second mirror 160. After that, the condensed first image light is reflected off a windshield 170 of a vehicle to reach driver's eyes 180.

The driver's eyes 180 visually identify the first image light displayed in the display element 110 far ahead of the windshield 170 as a virtual image 190.

In addition, second image light including an image or a picture, displayed in another region of the display element 110, is reflected off the beam splitter 120, and is further reflected off the reflection mirror 810, and then is transmitted through the beam splitter 120.

The second image light transmitted through the beam splitter 120 is reflected off the first mirror 150 to be condensed by the second mirror 160, and then is reflected off the windshield 170 to reach the driver's eyes 180.

The driver's eyes 180 visually identify the second image light far ahead of the windshield 170 as a second virtual image 193.

In this case, a virtual image distance of the first virtual image 190 can be changed by adjusting a distance between the movable mirror 130 and the beam splitter 120. Then, a virtual image distance of the second virtual image 193 is constant without being affected by adjustment of a distance between the movable mirror 130 and the beam splitter 120.

Accordingly, information to be displayed at any virtual image distance in a front scene can be displayed as the first virtual image, and information such as speed and warning, which is unnecessary to be superimposed on the front scene, can be always disposed at a fixed virtual image distance as the second virtual image. As described above, a head-up display device capable of displaying two screens can be fabricated.

In the present embodiment, the number of display elements 110 and a position of the reflection mirror 810 are not limited to only those in the structure of FIG. 11. For example, a plurality of display elements 110 may be provided, and virtual images may be formed at a plurality of respective different distances. In addition, a part of the beam splitter 120 can be used instead of the reflection mirror 810.

Other structure and operation are similar to those of the embodiment 1, so that detailed description thereof is eliminated.

[7-3. Summary]

In the head-up display device 8 of the embodiment 7, light emitted from the display element 110 is reflected off the beam splitter 120, and the light reflected off the beam splitter 120 is then reflected off the movable mirror 130 and the reflection mirror 810. The light reflected off the movable mirror 130 and the light reflected off the reflection mirror 810 each are transmitted through the beam splitter 120, and are reflected off the first mirror 150 to be condensed by the second mirror 160, and then are reflected off the windshield 170 of a vehicle to reach the driver's eyes 180. This allows the two virtual images 190 and 193 to be projected ahead of the driver's eyes 180 through the windshield 170. A display position of the virtual image 190 can be moved by the movable unit 140.

Accordingly, information to be displayed at any virtual image distance in a front scene can be displayed as the first virtual image, and information such as speed and warning, which is unnecessary to be superimposed on the front scene, can be always disposed at a fixed virtual image distance as the second virtual image, for example. As described above, a head-up display device capable of displaying two screens can be provided.

The reflection mirror 810 may be changed in position independently of the movable mirror 130. This enables a position of the virtual image 193 to be changed independently of a position of the virtual image 190.

(Embodiment 8)

FIG. 12 illustrates an example of a structure of an optical system unit 50 of a head-up display device 9 in an embodiment 8 of the present disclosure. In FIG. 12, the component same as that of FIG. 3 is designated as the same reference numeral to eliminate duplicated description.

In the embodiment 1 illustrated in FIG. 3, a plane mirror is used as the first mirror 150 in the second optical member. The present embodiment illustrated in FIG. 12 has a structure in which a spherical lens 950 is used as the second optical member, instead of the first mirror 150, so that the structure is different from that of the embodiment 1.

Instead of the spherical lens 950, an aspherical lens, a free-form surface lens, or the like may be used.

In addition, instead of the second mirror 160 in the second optical member, a spherical lens, an aspherical lens, a free-form surface lens, or the lime may be used.

Consequently, a projection optical system can be formed by using a lens instead of the reflection mirror without bending an optical path, for example, so that a head-up display device with a small-sized structure can be provided.

Also in the embodiments 2 to 7, a spherical lens, an aspherical lens, a free-form surface lens, or the like may be used instead of the mirror as the second optical member.

As described above, the embodiments 1 to 8 each are described as an example of the art disclosed in the present application. However, the art in the present disclosure is not limited to the embodiments, and is also applicable to an embodiment in which modification, substitute, addition, elimination, or the like is appropriately made to the embodiments. In addition, the components described in the embodiments 1 to 8 can be combined with each other to form an additional embodiment.

The embodiments each are described as an example of the art in the present disclosure. For that, the accompanying drawings and the detailed description are provided.

Accordingly, the components described in the accompanying drawings and the detailed description may include not only an essential component to solve the problem, but also a component that is unnecessary to solve the problem and is described for description of the art. Thus, description of the unnecessary component in the accompanying drawings and the detailed description does not allow the unnecessary component to be directly acknowledged to be essential.

In addition, the embodiments each described above show the art in the present disclosure, for example, so that various modifications, substitute, addition, elimination, or the like can be made within the scope of claims or its equivalent scope.

INDUSTRIAL APPLICABILITY

The head-up display device according to the present disclosure is applicable to a head-up display device in not only a vehicle, but also an aircraft, an electric train, a vessel, a specific vehicle, and the like.

The invention claimed is:

1. A head-up display device comprising:
a display that emits light to form a display image;
a light separator being an optical member that reflects light or through which light is transmitted, and that reflects light emitted from the display;
a first optical member that reflects light reflected off the light separator;
a second optical member, wherein the light reflected off the first optical member is transmitted through the light separator directly to the second optical member, which then reflects or transmits the light, to project a virtual image; and
an adjuster that moves the first optical member relative to the second optical member and that adjusts a distance between the first optical member and the light separator to adjust a projection distance of the virtual image.

2. The head-up display device according to claim 1, further comprising:
an image processor that adjusts the display image in the display,
the image processor adjusting display magnification of the display image in accordance with a projection distance of the virtual image.

3. The head-up display device according to claim 1, further comprising:
an image processor that adjusts display image information in the display,
the image processor correcting image distortion of the display image in accordance with a projection distance of the virtual image.

4. The head-up display device according to claim 1, further comprising:
at least one wavelength plate provided between the display and the light separator, or between the light separator and the first optical member, wherein the light separator is a wire grid polarizing element.

5. The head-up display device according to claim 1, wherein the second optical member includes a spherical concave mirror, a spherical convex mirror, a non-spherical concave mirror, a non-spherical convex mirror, or a free-form surface mirror.

6. The head-up display device according to claim 1, wherein the second optical member includes a spherical lens, an aspherical lens, or a free-form surface lens.

7. The head-up display device according to claim 1, wherein the display is a liquid crystal display element.

8. The head-up display device according to claim 1, wherein the display includes a plurality of laser beam sources, a scan unit that scans a beam emitted from the laser beam source, and a screen on which scanned light from the scan unit forms an image.

9. The head-up display device according to claim 1, wherein the adjuster adjusts a distance between the first optical member and the light separator according to location information on a vehicle.

10. The head-up display device according to claim 1, wherein the adjuster adjusts a distance between the first optical member and the light separator according to travel information on the vehicle.

11. The head-up display device according to claim 1, further comprising:
a third optical member that reflects light reflected off the light separator,
wherein the second optical member reflects light transmitted through the light separator after being reflected off the third optical member, or allows the light transmitted through the light separator to be transmitted through the second optical member, to project a virtual image different from the virtual image described above.

12. A vehicle comprising the head-up display device according to claim 1.

\* \* \* \* \*